United States Patent
Medwick et al.

(10) Patent No.: US 7,092,029 B1
(45) Date of Patent: Aug. 15, 2006

(54) STROBE LIGHTING SYSTEM FOR DIGITAL IMAGES

(75) Inventors: Robert A. Medwick, Aptos, CA (US); Glenn Stark, Santa Cruz, CA (US)

(73) Assignee: ESS Technology, Inc., Fremont, CA (US)

( * ) Notice: Subject to any disclaimer, the term of this patent is extended or adjusted under 35 U.S.C. 154(b) by 430 days.

(21) Appl. No.: 09/816,038

(22) Filed: Mar. 22, 2001

Related U.S. Application Data (60) Provisional application No. 60/192,008, filed on Mar. 24, 2000.

(51) Int. Cl.
*H04N 5/222* (2006.01)
*H04N 5/235* (2006.01)

(52) U.S. Cl. .................... 348/371; 348/370; 348/229.1

(58) Field of Classification Search ................ 348/370, 348/371, 229.1, 300; 396/61, 157, 155
See application file for complete search history.

(56) References Cited

U.S. PATENT DOCUMENTS

| | | | |
|---|---|---|---|
| 4,954,897 A * | 9/1990 | Ejima et al. ............. 348/229.1 |
| 5,420,635 A * | 5/1995 | Konishi et al. .............. 348/362 |
| 5,438,367 A * | 8/1995 | Yamamoto et al. ......... 348/371 |
| 5,987,261 A * | 11/1999 | Sugahara et al. ............. 396/61 |
| 6,151,073 A * | 11/2000 | Steinberg et al. ........... 348/371 |
| 6,195,127 B1 * | 2/2001 | Sugimoto .................... 348/370 |
| 6,674,466 B1 * | 1/2004 | Takaoka .................. 348/224.1 |
| 6,825,884 B1 * | 11/2004 | Horiuchi ..................... 348/362 |

* cited by examiner

*Primary Examiner*—David Ometz
*Assistant Examiner*—Kelly Jerabek
(74) *Attorney, Agent, or Firm*—Farjami & Farjami LLP (57) ABSTRACT

An image sensor acquires a preparatory image that is lighted for a predetermined preparatory duration by a strobe. The preparatory image data corresponding to the preparatory image from the image sensor is processed and an average preparatory image luminance is determined based on the preparatory image data and weighting at least a subset of the preparatory image data. A supplemental strobe duration is generated based on the average preparatory image luminance and luminance weightings. The electronic image sensor may be activated to acquire an image with supplemental light provided by the supplemental strobe duration.

28 Claims, 10 Drawing Sheets

| | |
|---|---|
| 50 us | 1000 |
| 25 us | 349 |
| 50 us | 981 |
| 75 us | 1453 |
| 100 us | 2075 |
| 400 us | 4217 |
| 800 us | 5387 |

Look-up Table
FIG. 6

FIG. 7

Blocks of Image Data

FIG. 8

| 0 | 0 | 0 | 0 | 0 | 0 | 0 | 0 |
|---|---|---|---|---|---|---|---|
| 0 | 1 | 1 | 1 | 1 | 1 | 1 | 0 |
| 0 | 1 | 2 | 4 | 4 | 2 | 1 | 0 |
| 0 | 1 | 4 | 8 | 8 | 4 | 1 | 0 |
| 0 | 1 | 4 | 8 | 8 | 4 | 1 | 0 |
| 0 | 1 | 2 | 4 | 4 | 2 | 1 | 0 |
| 0 | 1 | 2 | 2 | 2 | 2 | 1 | 0 |
| 0 | 1 | 2 | 2 | 2 | 2 | 1 | 0 |

Luminance Weighting Table

FIG. 9

FIG. 10 Calibrating the Look-up Table

STROBE LIGHTING SYSTEM FOR DIGITAL IMAGES

CROSS-REFERENCE TO RELATED APPLICATIONS

This application claims the benefit of Provisional Patent Application Ser. No. 60/192,008, filed on Mar. 24, 2000, and entitled STROBE FOR A DIGITAL CAMERA.

BACKGROUND OF THE INVENTION

1. Technical Field

This invention relates generally to a strobe lighting system used in the capturing of for digital images.

2. Related Art

Digital cameras for capturing digital images are commercially available and allow individuals to create digital images, rather than images on film as with traditional cameras. In a digital camera, an image sensor measures reflected light from an object that is processed into a digital image.

Typically, digital cameras and other imaging products utilize image sensors (also known as electronic image sensors) that are solid-state devices. Examples of image sensors include charge-coupled device (CCD), charge injection devices (CID) and complementary metal oxide semiconductor (CMOS) imagers. The image sensors typically have a number of cells or pixels arranged along vertical and horizontal dimensions commonly referred to as a matrix (also known as a pixel array). Image sensors typically utilize off-chip signal processing to improve signal to noise (S/N) performance and compensate for reset noise. Image sensors may be found in various pixel array configurations, including SIF or QVGA 320×240, CIF 352×288, VGA 640×480, SVGA 800×600, XGA 1024×768, SxGA 1280×1024, 2 Mega pixel, 3 Mega pixel and 16 Mega pixels.

Image information sensed by each pixel of an image sensor is converted into a digital signal. The digital signal is created from the image information stored in the pixels of the pixel array and is output serial using an arrangement of shift registers (in the case of CCD) or via a row and column selection (in the case of CMOS imager). After the image information is converted into a digital signal referred to as image data, the image data is stored in a memory. The image data may be post processed by a digital signal processor (DSP) to improve the quality of the digital image.

An image sensor capable of capturing color images increase the complexity of processing the digital image data. In one approach, the image sensor has a geometric arrangement of cells forming a pixel responding to three primary colors, eg., red, green and blue. Since each cell senses a particular color, various algorithms are used to interpolate the missing color information. Alternately, two or more image sensors having different color sensitivity may be utilized and the image data combined by a signal processor.

When taking photographs with a traditional film camera, it is often desirable to have additional lighting to illuminate a subject. A "flash" is often utilized with a camera to provided illumination of the subject. Consequentially, problems exist when too much light or not enough light is reflected from the subject (also known as a object) onto the file. The problems of under exposure and over exposure result when too much light or too little light reach the film. Similar lighting problems exist with digital photography using an image sensor in place of film.

An image sensor utilized to capture an image has the same problems with subject lighting as traditional film cameras. A supplemental lighting source, such as a strobe, may be utilized with digital camera having an image sensor. The duration of the supplemental light is determined based on an average value of a preparatory image data. However, the amount of light generated does not correspond to a particular area of interest in the image. For example, in a portrait, the subject is typically placed in an area of interest in the center of the image; however, the supplemental light is generated based on the entire image, including the background. The light from the background behind the subject affects the calculation of the supplemental light in the same manner as the subject, and as such reduces the visual quality of the image. Therefore a system is needed to generate supplemental light that accords more weight to an area of interest of the image.

SUMMARY

Broadly conceptualized, the invention is an approach to determine an average preparatory image luminance based on the preparatory image data and weighting at least a subset of the preparatory image data. Thus, the electronic image sensor is activated to acquire a photographic image. Supplemental light is provided in accordance with a supplemental strobe duration. Photographic image data corresponding to the photographic image from the electronic image sensor is captured. The duration of the supplemental strobe is adjusted based on the weighting of the luminance of the preparatory image, resulting in an increase in the visual quality of the exposed digital image.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

The following patent applications are incorporated by reference to assist in the description of certain elements and features of this invention. They are described in greater detail later in the specification, but include:

U.S. patent application, titled "Programmable Image Transform Processor for a Digital Camera," Ser. No. 09/188,871, filed Nov. 9, 1998;

U.S. patent application, titled "Programmable Timing Generator for a Digital Camera," Ser. No. 09/188,831, filed Nov. 9, 1998;

U.S. patent application, titled "Programmable Display Controller for a Digital Camera," Ser. No. 09/188,996, filed Nov. 9, 1998.

Figure 1:
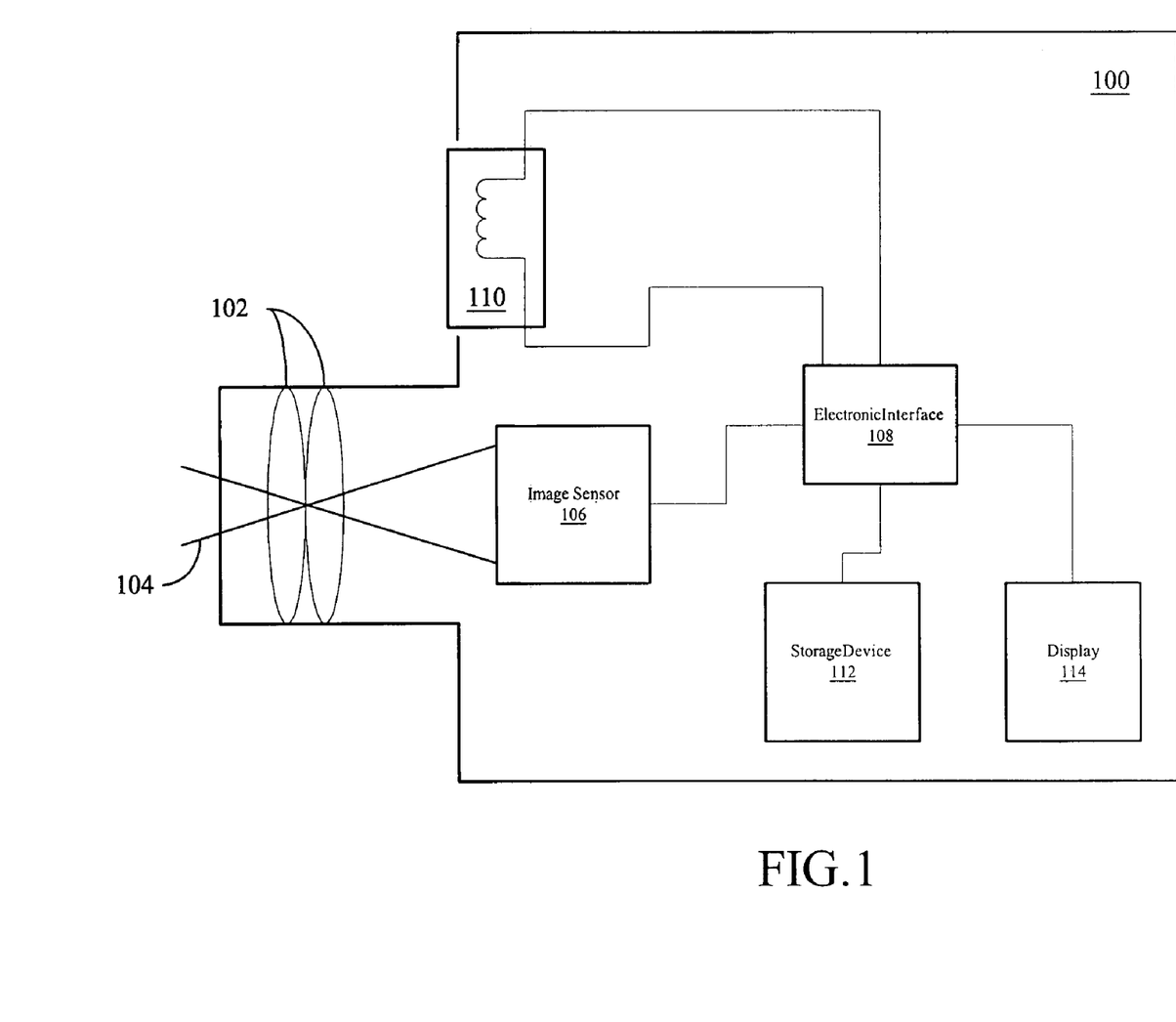
FIG. 1 is a block diagram of a digital camera having an electronic image sensor and supplemental light.

In FIG. 1, a block diagram of a digital camera 100 having an electronic image sensor and supplemental light is shown. A lens 102 transmits the image-forming light 104 onto an electronic image sensor (image sensor) 106. The image sensor 106 is built into the digital camera 100 and is located at the focal plane of the lens 102. The image sensor 106 is typically a charge-coupled device (CCD), charge injection device (CID) or a complementary metal-oxide-semiconductor (CMOS) sensor.

Image sensors differ in the arrangement of the cells within the image sensor and the type of charge readout. The image sensor 106 connects to an electronic interface circuitry 108. The electronic interface circuitry 108 also connects to a strobe 110, a storage device 112 and a display 114. The electronic interface circuitry 108 controls the amount of time that the strobe 110 is activated to generate supplemental light. The electronic interface circuitry 108 controls the storage device 112 and enables sensed images by the images sensor 106 to be stored. The storage device 112 may include a tape drive, a disk drive, such as a floppy disk drive, hard disk drive, optical disk drive, or magneto-optical disk drive, or an integrated circuit card with RAM or electrically erasable programmable read only memory (EEPROM). The storage device 112 may be inside the digital camera 100 or attached to the digital camera 100 externally. The electronic interface circuitry 108 can also control the display 114 to display the image sensed by the image sensor 106. The display 114 may be inside the digital camera 100 or attached to the digital camera 100 externally. The display 114 is optional and the digital camera 100 may function without the display 114. The electronic interface circuitry 108 may operate the display 114 in a viewfinder mode or a review, (i.e., stored image viewing) mode, if the display 114 is present.

Figure 2:
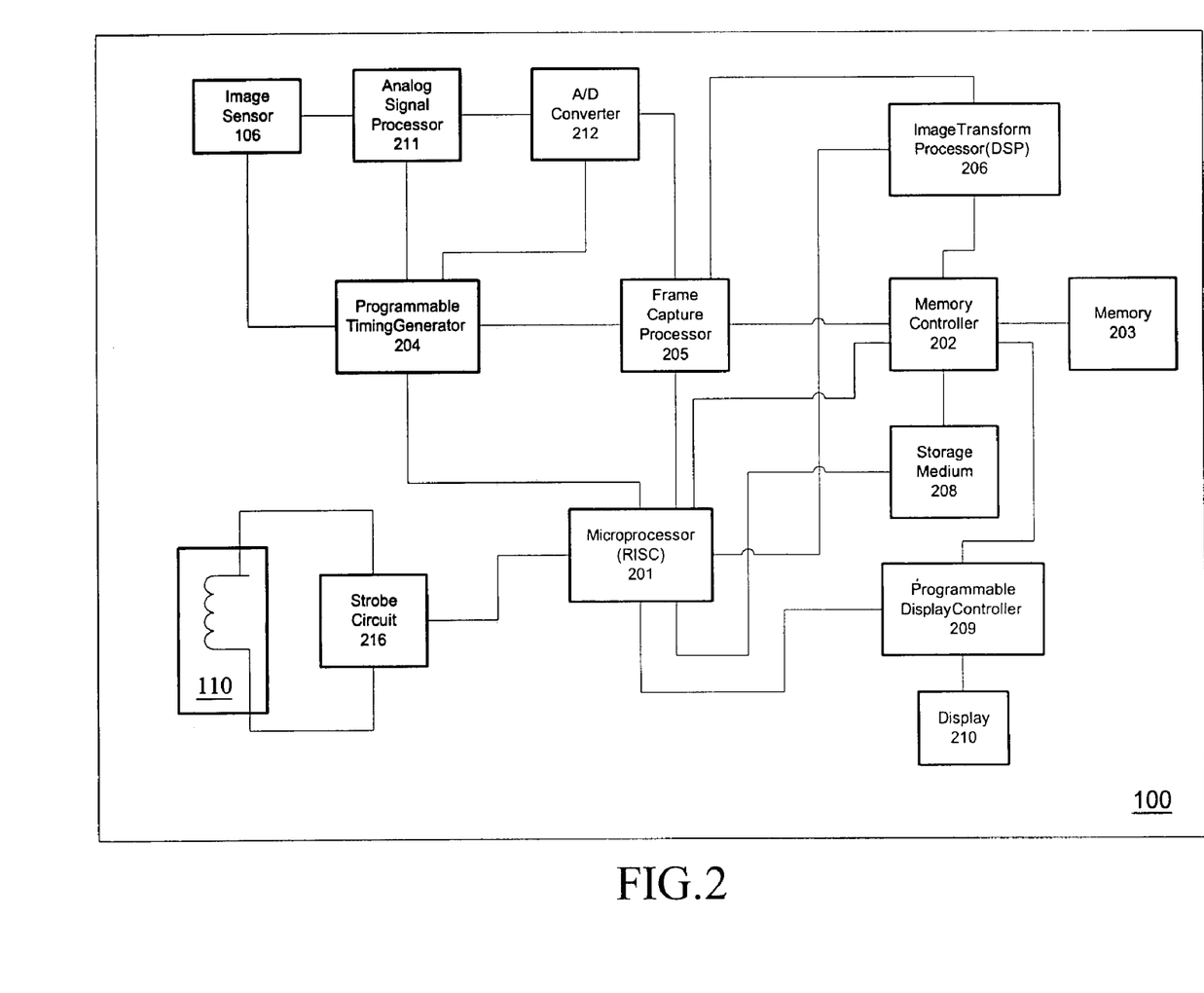
FIG. 2 is a block diagram of the digital camera of FIG. 1.

FIG. 2 is a block diagram of the digital camera 100 of FIG. 1. A microprocessor (RISC) 201 is coupled to a memory controller 202, a programmable timing generator 204, a frame capture processor 205, a programmable image transform processor 206, a storage medium 208 and a display controller 209. The memory controller 202 is connected to a memory 203. The display controller 209 is coupled to a display 210. The image sensor 106 is coupled to an analog signal processor (ASP) 211 that connects to the analog-to-digital converter (A/D converter) 212. The timing generator 204 is coupled to the image sensor 106, ASP 211 and A/D converter 212, the frame capture processor 205, and the microprocessor 201. The programmable image transform processor 206, commonly called a digital signal processor (DSP), and other elements read data from the write data to the memory 203 via the memory controller 202. Preferably, the memory 203 includes a high-speed DRAM to store the digital image data. The A/D converter 212 supplies digital image data to the image transform processor 206. The image transform processor 206 stores the digital image data in the memory 203. The timing generator 204 supplies timing signals to the DSP 206 and A/D converter 212 to synchronize the transfer of digital image data between the A/D converter 212 and the frame capture processor 205. The frame capture processor 205 supplies the digital image data to the DSP 206. Alternately, the frame capture processor 205 stores the digital image data from the sensor directly into the memory 203, and the DSP 206 fetches the data from the memory for further processing. The frame capture processor 205 supports real-time windowing, histogram, gamma correction, white balance, and auto-focus functions. A strobe circuit 216 interfaces the strobe 110 with the microprocessor 202.

Figure 3:
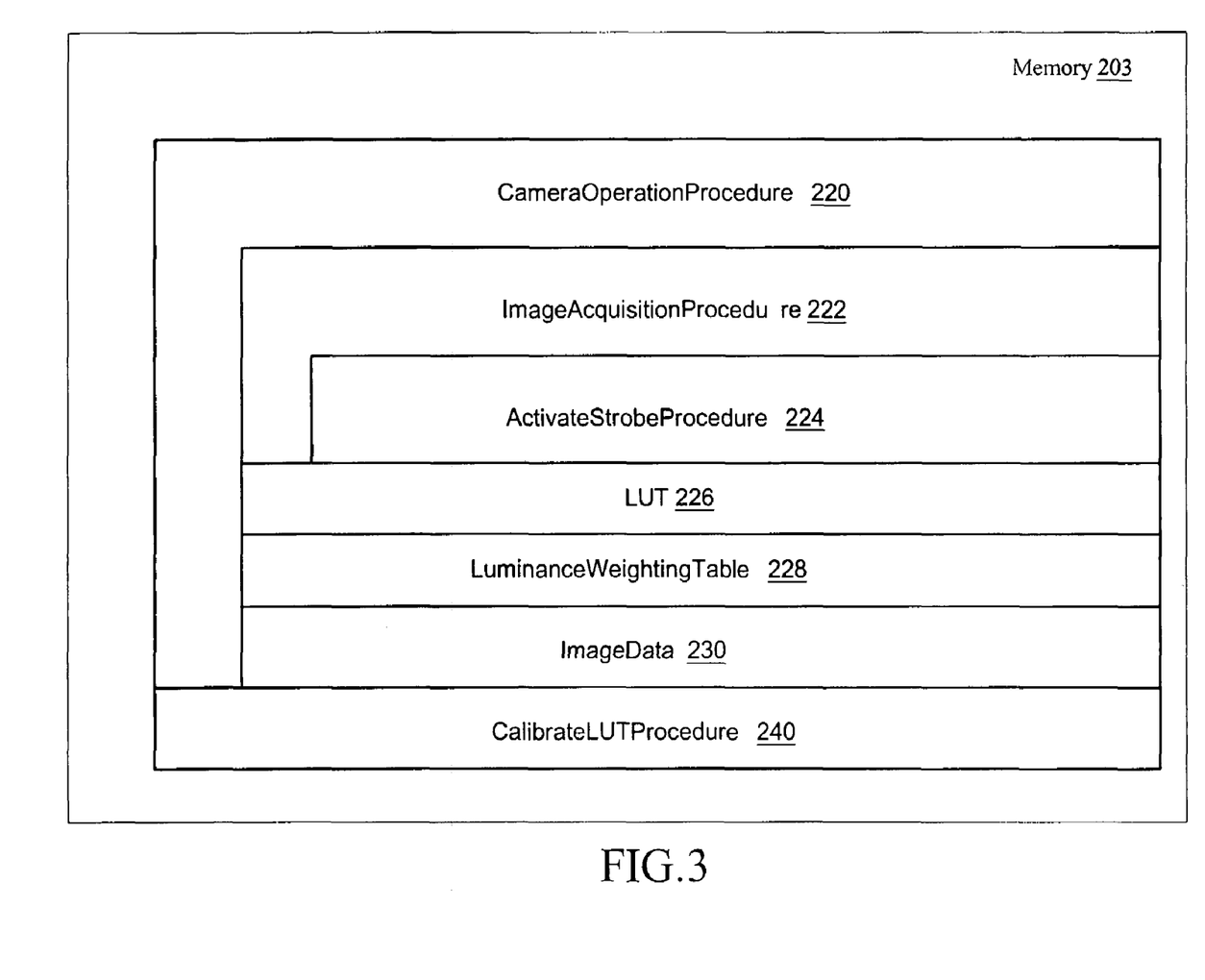
FIG. 3 is a block diagram showing at least a portion of procedures and data stored in a memory block of FIG. 2.

FIG. 3 is a block diagram showing at least a portion of procedures and data stored in a memory block of 203 of FIG. 2. The memory 203 stores procedures and digital image data as follows:

A camera operation procedure 220 for controlling the overall operation of the digital camera 100.

An image acquisition procedure 222 that acquires image data representing an image.

An activate strobe procedure 224 that operates the strobe 110, FIG. 2, when the image acquisition procedure 222 determines that supplemental light is needed. The image acquisition procedure 222 invokes the activate strobe procedure 224.

A look-up table (LUT) 226 that is accessed by the activate strobe procedure 224 to determine a duration for activating the strobe 110, FIG. 2, when acquiring an image; preferably, the LUT 226 is stored in non-volatile memory such as an EEPROM.

A luminance weighting table 228 that is accessed by the activate strobe procedure 224 to determine the amount of weight given to portions of preliminary image data.

Image data 230 that includes preliminary image data; the image data 230 is a digital representation of the image sensed by the image sensor 106, FIG. 1.

A calibrate LUT procedure 240 that populates the LUT 226; the calibrate LUT procedure 240 is loaded into the memory 203 from a storage medium 208, FIG. 2, such as a floppy disk, during the manufacturing process; once the LUT 226 is populated, the calibrate LUT procedure 240 is no longer stored in the memory 203.

Referring to both FIG. 2 and FIG. 3, the microprocessor (RISC) 201 executes the camera operation procedure 220, which is stored in memory 203. Alternately the camera operation procedure 220 may be stored in a ROM, or loaded into the memory 203 from the storage medium 208. The digital camera 100 operation procedure 220 includes the image acquisition procedure 222. When a user presses a store-image button (not shown), the camera operation procedure 220 causes the image sensor 106 to acquire an image. The image acquisition procedure 222 causes the microprocessor 201 to control the programmable timing generator 204 to generate vertical and horizontal clock signals for use the image sensor 106. The image sensor 106 outputs image data comprising a series of analog signals corresponding to the color and intensity of the image sensed by each cell of the image sensor 106. The image data is then sent to the ASP 211 and to the A/D converter 212.

The ASP 211 processes the image data before input to the A/D converter 212. For example, the ASP has a programmable amplifier with adjustable gain, and also reduces or eliminates noise, such as reset noise, from the image data using methods well known to those in the art, such as correlation-double-sampling. The A/D converter 212 then converts the analog image data into digital image data. In an alternate embodiment, the ASP 211 is not utilized.

The digital image data is stored in memory 203. Execution of the camera operation procedure 220 by the microprocessor 201 causes the digital image data to be processed by the programmable image transform processor 206. The processed digital image data is compressed and recorded in memory 203, on a storage medium 208 or transferred to display controller 209 for output to a display 210.

To control the operation of the strobe 110, the microprocessor 202 connects to a strobe circuit 216. The strobe circuit 216 includes a high voltage power supply that supplies power to activate the strobe 110 in response to a signal from the microprocessor 201. The image acquisition procedure 222 sends signals to the strobe circuit 216 causing the strobe 110 to generate supplemental light.

U.S. patent application, titled "Programmable Image Transform Processor for a Digital Camera," Ser. No. 09/188,871, filed Nov. 9, 1998, is incorporated by reference as information explaining the operation of the image transform processor 206. U.S. patent application, titled "Programmable Timing Generator for a Digital Camera," Ser. No. 09/188,831, filed Nov. 9, 1998, is also incorporated by reference as information explaining the operation of the timing generator 204. U.S. patent application, titled "Programmable Display Controller for a Digital Camera," Ser. No. 09/188,996, filed Nov. 9, 1998, is also incorporated by reference as information explaining the operation of the display controller 209.

Figure 4:
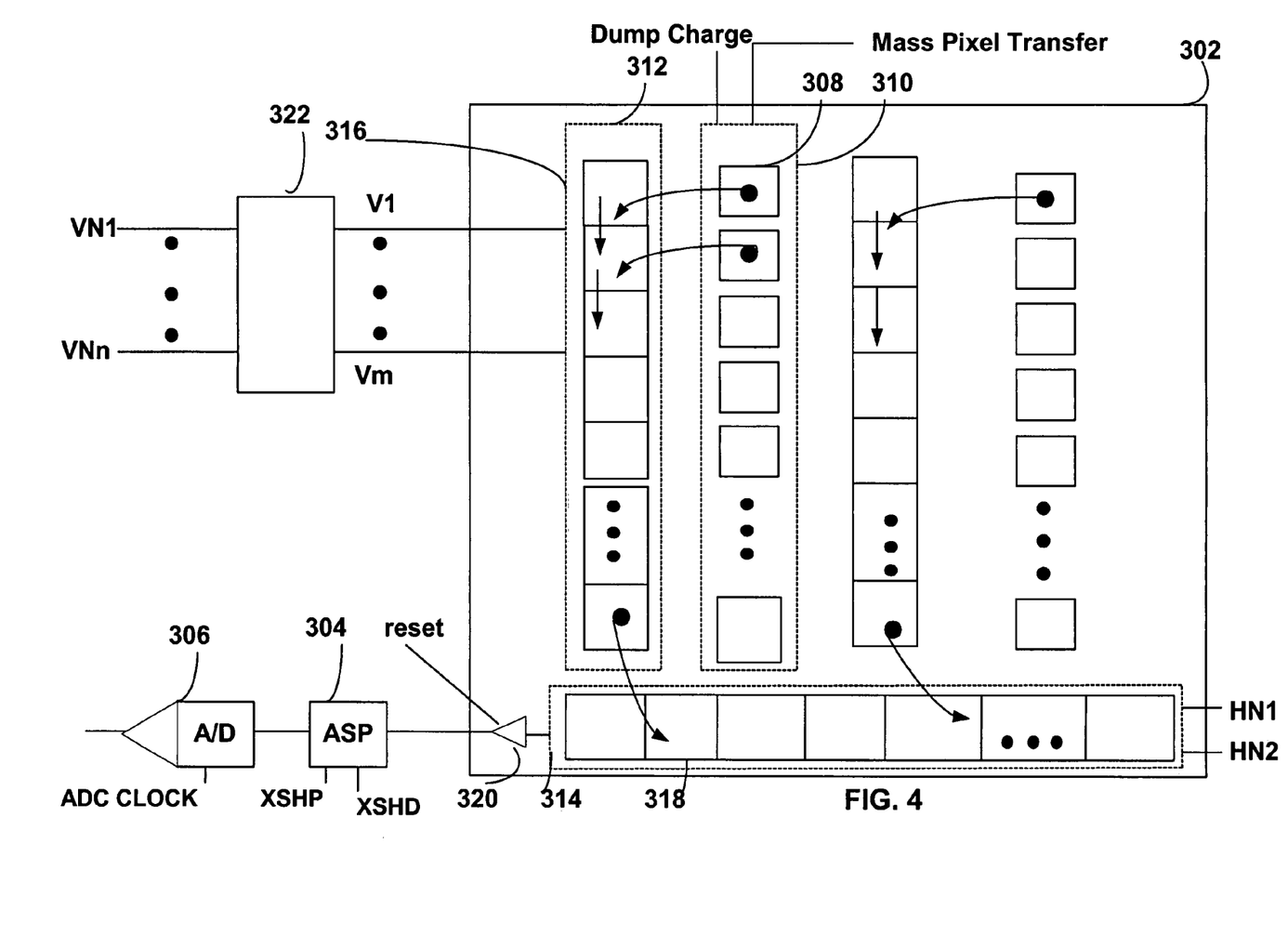
FIG. 4 is a block diagram of an exemplary electronic image sensor suitable for use in the digital camera of FIG. 1.

In FIG. 4, a diagram of an exemplary electronic image sensor suitable for use in the digital camera 100 of FIG. 1 is shown. The image sensor 302 may be a CCD, CID or CMOS device. In the example implementation of a CCD, the image sensor 302 connects to the ASP 304 and the A/D converter 306. The image sensor 302 has cells 308, vertical shift registers 312 and a horizontal shift register 314. Each cell 308 absorbs light and converts the light energy into an electrical charge. The amount of charge is a measure of light energy absorbed. The size of the image sensor determines the quality of the image. The quality of the image improves as the number of cells increases. Image sensors are available in many sizes, such as SIF or QVGA 320×240, CIF 352×288, VGA 640×480, SVGA 800×600, XGA 1024×768, SxGA 1280×1024, 2 Mega pixel, 3 Mega pixel and 16 Mega pixels.

The components of the image sensor 302 are arranged along horizontal and vertical dimensions. An array 310 of cells 308 is arranged in the vertical dimension. The vertical shift register 312 has elements 316 for storing the charge sensed by the cells 308. Each cell 308 in the array of cells 310 connects to a corresponding element 316 in the vertical shift register 312.

Free charge moves from regions of higher potential to regions of lower potential. By alternating the voltages on the electrodes (not shown) connected to the cells 308 and the elements 316 and 318 of the shift registers 312 and 314 in proper phase, a charge packet, i.e., the charge from the cell 308, can be moved from the cell 308 to an element 316 of the shift register 312 and then moved from one element to another element in the shift registers and finally to the image sensor 302 output.

Thus, when appropriate voltages are applied to the cell 308 and the corresponding element 316 in the vertical shift register 312, the charge generated in the cell 308 is transferred out of the cell 308 to the corresponding element 316 in the vertical shift register 312. The programmable timing generator is programmed to generate timing or clock signals that cause the transfer of the charge to occur at the appropriate time. When appropriate voltages are applied to adjacent elements of the vertical shift register 312, the charge is transferred from one element to another. The last element or output of each vertical shift register 312 connects to a corresponding element 318 in the horizontal shift register 314. When appropriate voltages are applied to the last element of the vertical shift register 312 and the corresponding element 318 of the horizontal shift register 314, the charge is transferred from the vertical shift register 312 to the horizontal shift register 314. When appropriate voltages are applied to adjacent elements of the horizontal shift register 314, the charge is transferred from one element to another and finally output. The output of the horizontal shift register 314 connects to the ASP 304 via an output amplifier 320.

The cells of the image sensor acquire an image or charge when exposed to light. Therefore, the image sensor has a port for receiving an OverFlowDrain pulse, or DumpCharge signal to reset the cells of the image sensor. The DumpCharge signal is pulsed one or more times prior to the star of exposure. The exposure time begins after the last DumpCharge pulse and ends when either a mechanical shutter is closed, or if an electronic shutter is used, when the accumulated charge in the cells is transferred to the vertical shift registers. A mass pixel transfer signal causes the image sensor to transfer the charge in its cells to the vertical shift registers to capture an image.

Various signals are utilized to control the image sensor and to synchronize its operation with other system components. An amplifier reset signal connects to the output amplifier 320. XSHP and XSHD signals control the ASP 304 and an ADC clock signal connects to the A/D converter 306. Horizontal clock signals H 1 and H 2 control the horizontal shift register 314. Vertical clock signals V 1 to V n connect to a vertical clock driver 322 that generates signals V1 to Vm to control the vertical shift registers. In one embodiment, signals V 1 to V n are binary signals, while signals V1 to Vm are binary signals having three states.

Color imaging is more complex. In one method, the image sensor 302 has a geometric arrangement of cells to respond to three colors, e.g., red, green and blue. Alternately, two or more image sensors having different color sensitivity are used. In another embodiment, the image sensor 302 includes a color filter that causes either red, green or blue light to pass to the pixels on the image sensor in a predefined pattern, such as a Bayer pattern. Each pixel receives a single color, and the output from the image sensor includes a red, a green and a blue color channel.

It is appreciated by those of skill in the art that while a CCD has been described, the image sensor 106 may equally be implemented in a CID or CMOS imager. In the case of a CMOS imager, the image sensor may contain a photodiode, row-select transistor and a reset transistor per pixel in the pixel array. By activating a row, the data from the pixels in that row simultaneously copied into the columns. Each column will have a load transistor, column select switch, and a sampling switch. In this example the CMOS imager does not rely upon charge transfer such as the CCD. Unlike CCDs, the CMOS imager may be fully addressable and the pixels in the pixel array may be read out at high frame rates.

Figure 5:
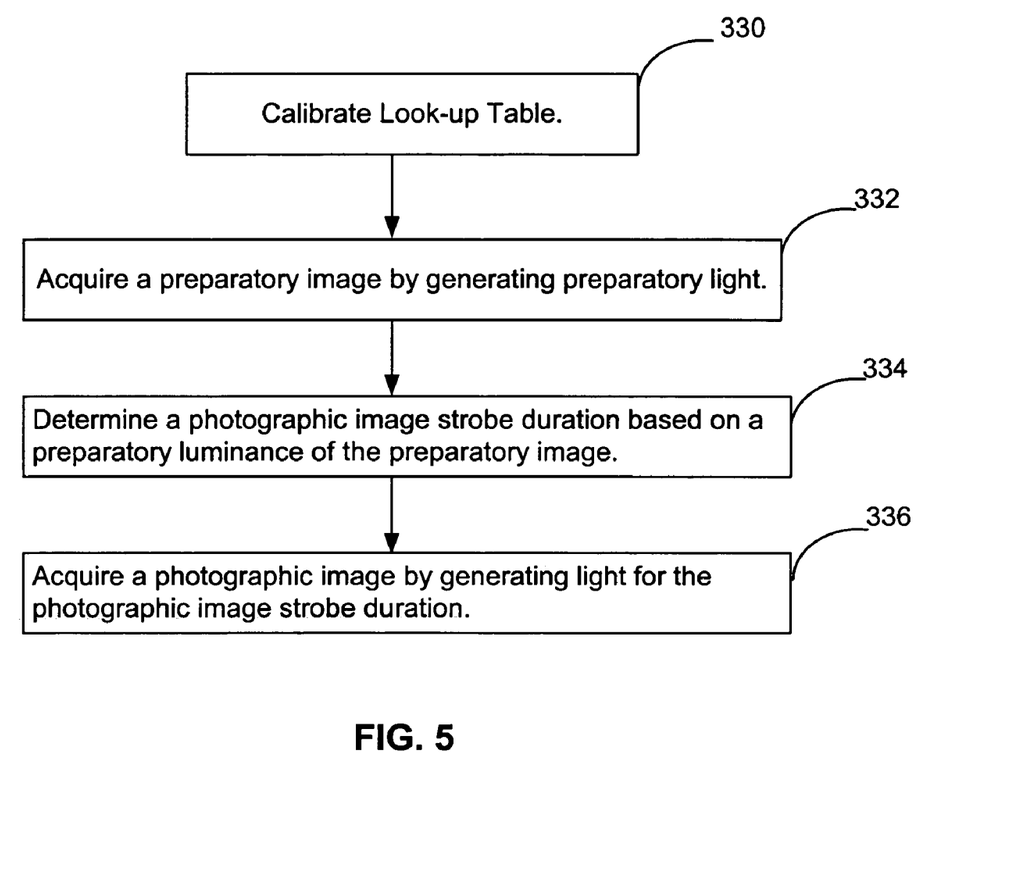
FIG. 5 is a flowchart showing the calibration of the electronic image sensor of FIG. 4.

FIG. 5 is a flowchart showing the calibration of the electronic image sensor of FIG. 4. In step 330, the calibrate look-up table procedure 240 populates the look-up table 226. Steps 332–334 are implemented by the activate strobe procedure 224 of FIG. 4. In step 332 the activate strobe procedure 224 acquires a preparatory image while generating preparatory light. To generate the preparatory light, the strobe is activated for a predetermined period of time, such as fifty microseconds. The exposure time of the preparatory image is short with respect to the exposure time of a photographic image to reduce the effect of any ambient light on the preparatory image.

For example, the exposure time of the preparatory image is approximately one millisecond, while the exposure time of the photographic image is approximately 33.3 milliseconds (1/30 second). The strobe is activated to generate the preparatory light shortly after the exposure time begins. In step 334, the activate strobe procedure 224 determines a photographic image strobe duration based on a preparatory luminance of the preparatory image. In step 336, the activate strobe procedure 240 acquires a photographic image by activating the strobe for the photographic image strobe duration. In step 338, after acquiring the photographic image, the image acquisition procedure 240 performs additional adjustments to the photographic image. For example, the image acquisition procedure 240 may adjust the white-balance and color balance, enhance the edges, the perform chroma suppression to whiten the white areas and darken the black areas of the photographic image.

Figure 6:
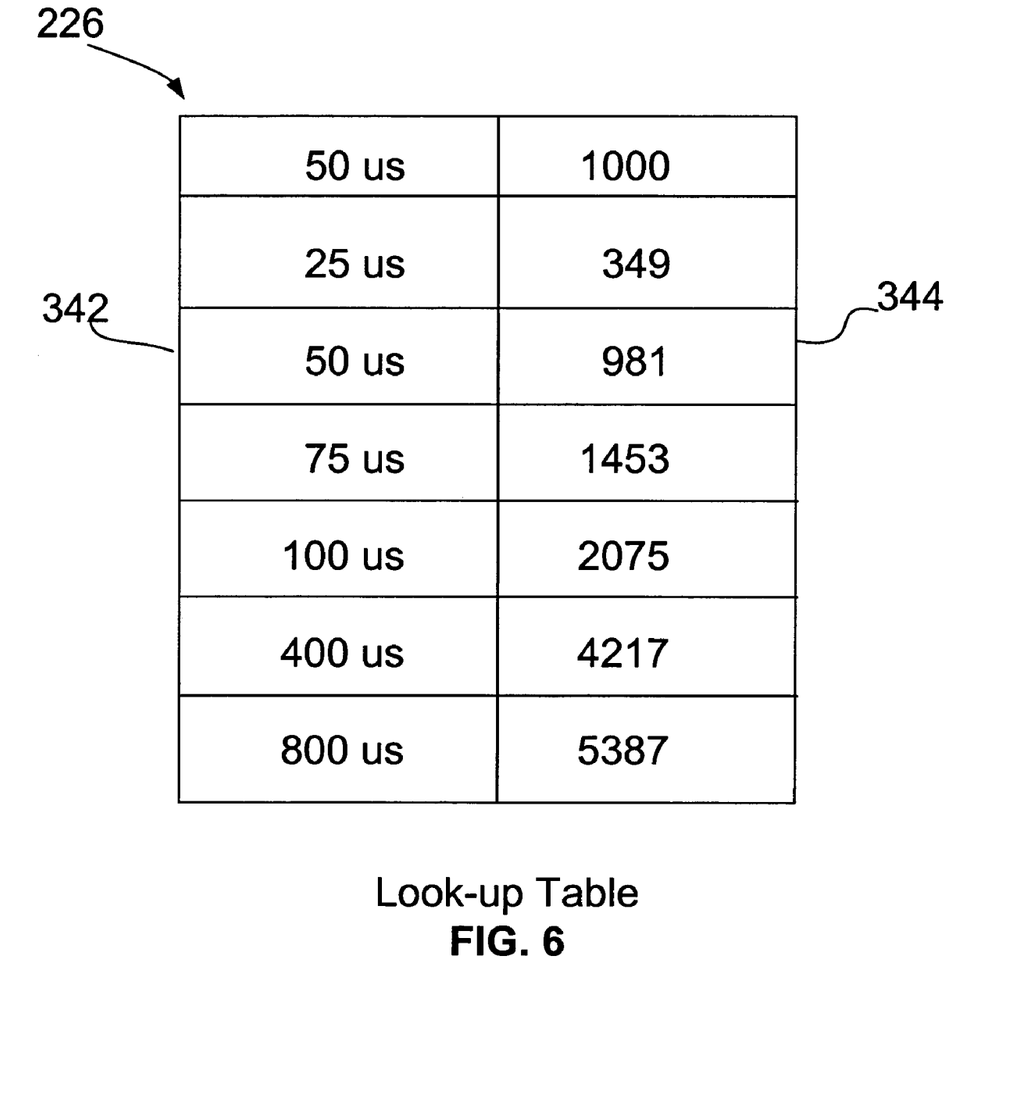
FIG. 6 is a look-up table stored in the memory of FIG. 2, as identified in FIG. 3.

In FIG. 6, a look-up table stored in the memory of FIG. 2, as identified in FIG. 3 is shown. The look-up table 226 stores a strobe duration 342 and an associated power value 344. The associated power value 344 represents a percentage of the luminance at the specified strobe duration divided by the luminance at a nominal strobe duration. In the look-up table, the first entry pair is 50 microseconds (s) with an associated power value of 100.0% and represents a nominal power value for a nominal average luminance at a preparatory strobe duration, which is discussed with reference to FIG. 10. The subsequent durations from 25 s to 800 s have power values that are relative to the first 50 s entry. For example, for a strobe duration of 25 s, the power value is 34.9% of the power value of at the nominal 50 s duration. Alternately, the associated power values 344 represent fractions rather than a percentage.

Figure 7:
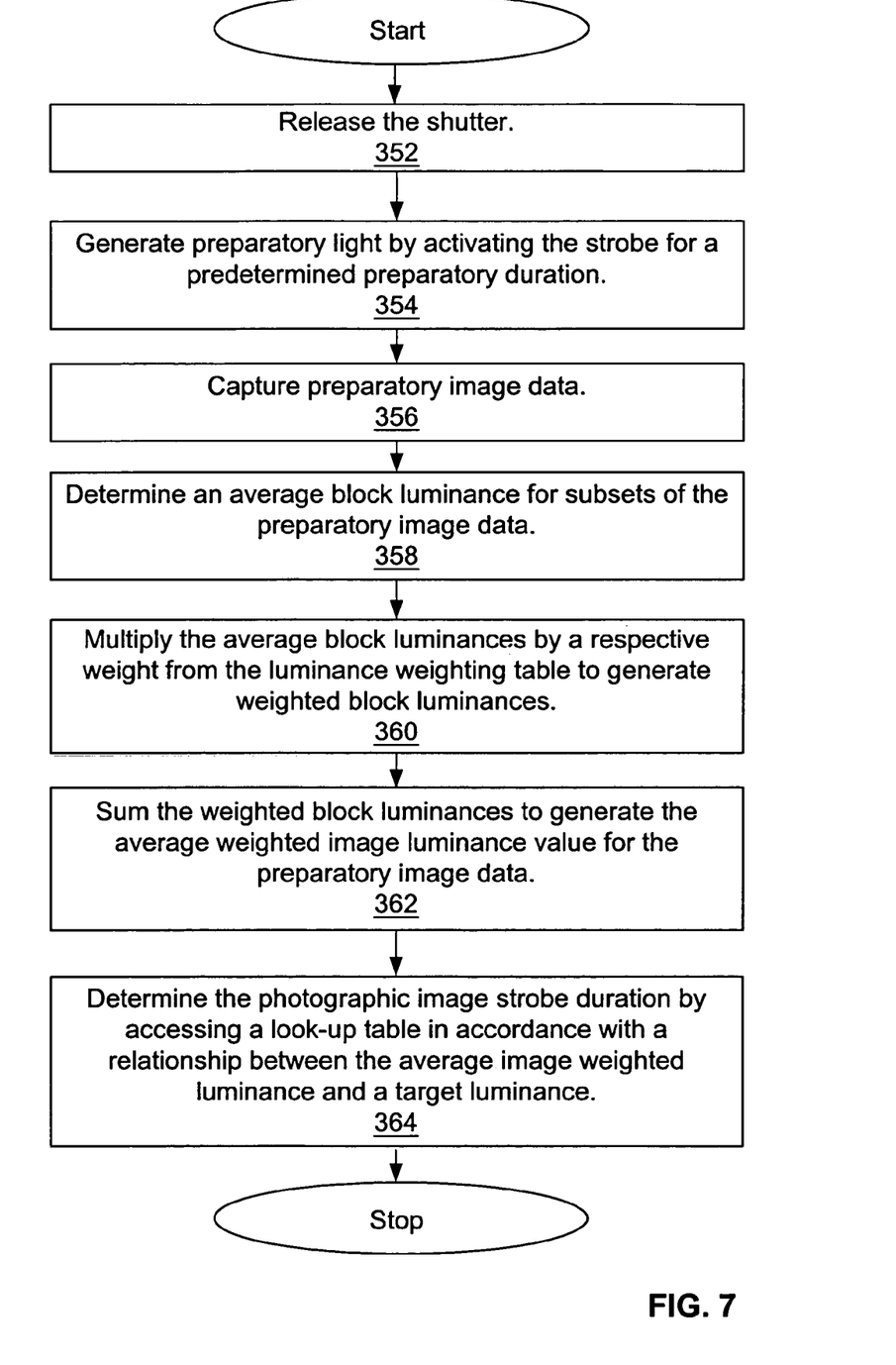
FIG. 7 is a flowchart of an activate strobe procedure of FIG. 3 and FIG. 5.

FIG. 7 is a flowchart of an activate strobe procedure of FIG. 3 and FIG. 5. Steps 352 and 354 of FIG. 7 provide more detail with respect to step 332 of FIG. 5. Steps 358–364 of FIG. 7 provide more detail with respect to step 334 of FIG. 5. In step 352, the activate strobe procedure 224 releases the shutter to cause the image sensor to accumulate charge representing an image. In one embodiment, the shutter is released electronically by applying the DumpCharge Signal of FIG. 4 to the image sensor 106 of FIG. 2 to remove any accumulated charge from the cells of the image sensor. In an alternate embodiment, a mechanical shutter is opened to allow the image sensor to receive light. In step 354, the activate strobe procedure 224 generates preparatory light by activating the strobe for a predetermined preparatory duration. In step 356, the activate strobe procedure 224 captures preparatory image data associated with the preparatory image. The activate strobe procedure 224 captures preparatory image data associated with the charge accumulated on the image sensor and stores the preparatory image data in the memory.

In step 358, the activate strobe procedure 224 determines an average block luminance for subsets of the preparatory image data. In one embodiment, steps 356 and 358 are performed concurrently. Alternately, steps 356 and 358 are performed sequentially. Preferably, the preparatory image has sixty-four subsets or blocks and each subset has an average block luminance. The blocks are rectangular and the number of pixels in a block varies depending on the size of the image sensor.

The pixels on the sensor are arranged behind a red-green-blue filter having a Bayer-pattern. The symbol "R" refers to a pixel behind the red filter, the symbol "G" refers to a pixel behind the green filter, and the symbol "B" refers to a pixel behind the blue filter. The arrangement of the filters and pixels is as follows:

R G R G R G . . .
X
G B G B G B . . .

A digital value corresponding to an intensity of the amount of light impinging on a pixel is stored in the memory. The intensity of a red pixel is $I_R$, the intensity of a $$0.1I_B + 0.3I_R + 0.6I_G \quad (1)$$

greed pixel is $I_G$, and the intensity of a blue pixel is $I_B$. The following relationship is used to determine the luminance for a group of pixels referred to as a spot, as designated by the "X" above:

Because there are two green pixels, the intensity $I_G$ is equal to the average intensity of the two green pixels. Alternately, relationship one is modified by reducing the 0.6 factor to 0.3, and adding the intensity of the green pixels, $I_{G1}$ and $I_{G2}$, as shown in relationship two as follows:

$$0.1I_B + 0.3I_R + 0.3I(I_{G1} + I_{G2}) \quad (2)$$

Figure 8:
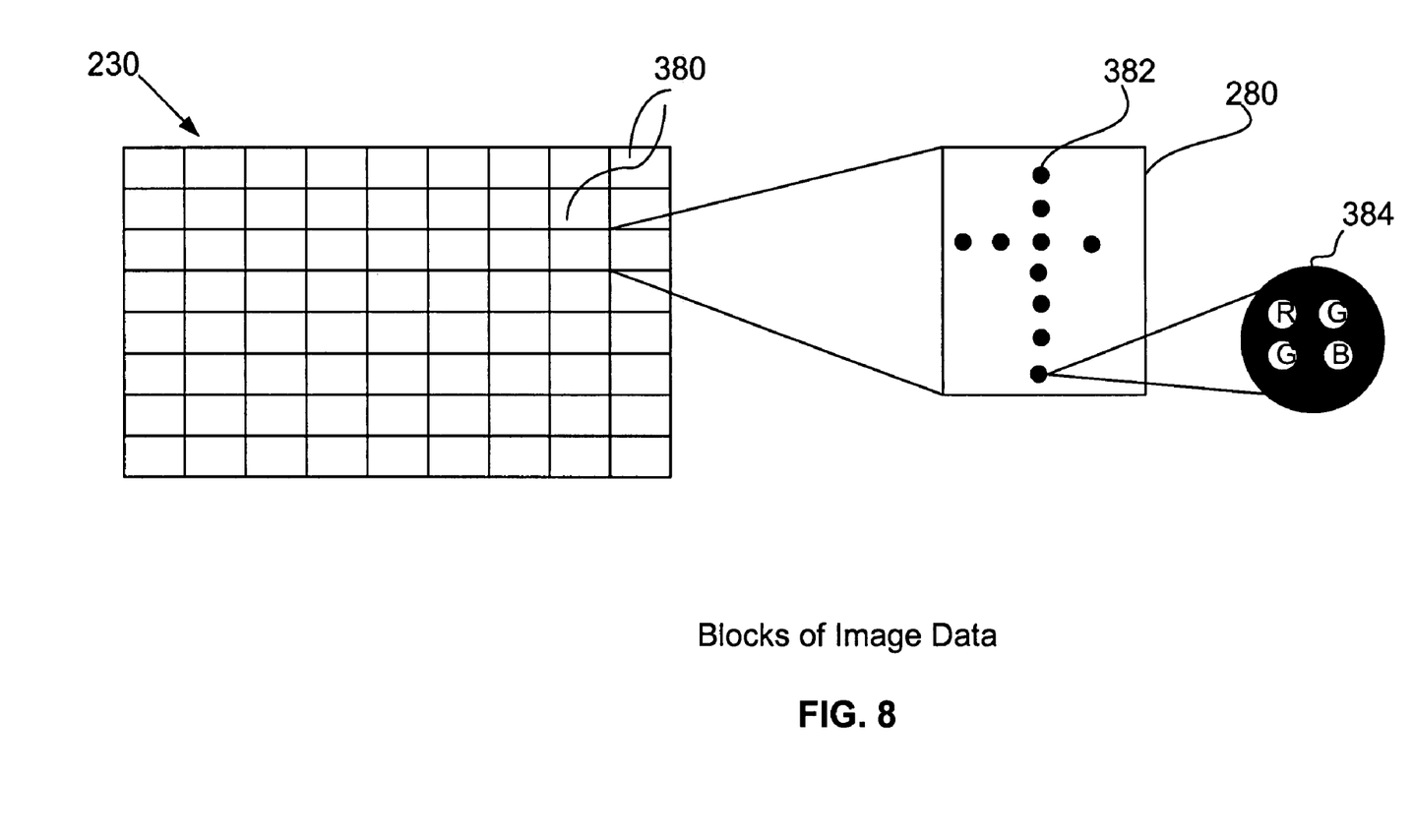
FIG. 8 is an exemplary image data that is divided into blocks with a selected subset of spots having pixels that are arranged in a Bayer-pattern.

Referring also to FIG. 8, the image data 230 has many blocks 380. Each block 380 includes a rectangular array of pixels. The luminance is determined for a plurality of spots 382 within each block 380. The plurality of spots is selected in accordance with a predetermined spot pattern. In this example, the spot pattern is four spots across an approximate horizontal centerline of the block 380, and six spots aligned with an approximate vertical centerline of the block 380. The image data for an exemplary group of pixels 384 is used to determine the luminance of the spot 382 using relationship one above. The luminance of the plurality of spots 382 is summed to generate the average block luminance for the block 380. In an alternate embodiment, the luminance of the plurality of spots 382 is summed to provide an intermediate sum that is divided by the number of spots in the plurality of spots to generate the average block luminance for block 380.

Referring back to FIG. 7, in step 360, the activate strobe procedure 224 applies a weight to the average block luminance by multiplying the average block luminance, for at least a subset of the blocks, by a respective weight from the luminance weighting table to generate weighted block luminances.

Figure 9:
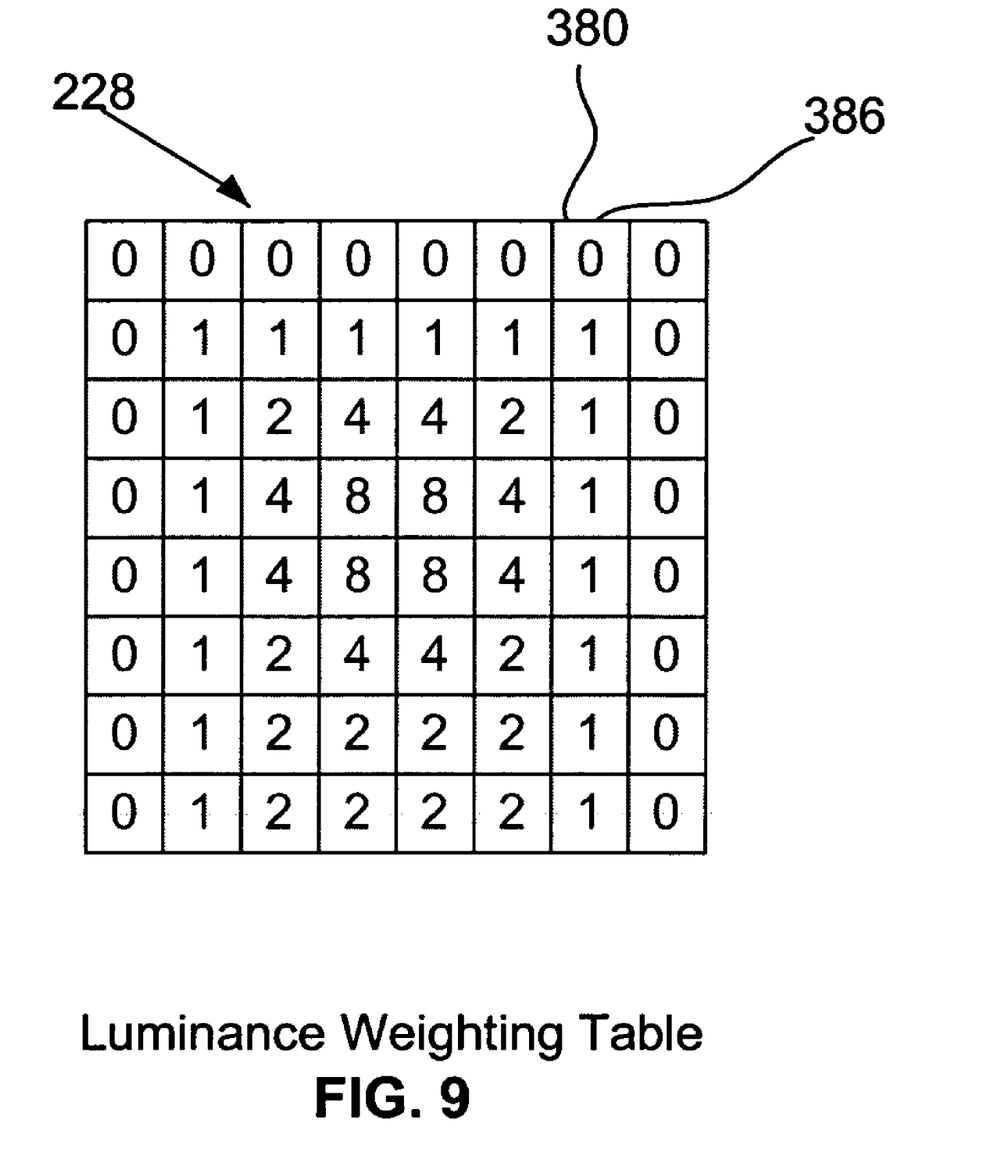
FIG. 9 is an exemplary luminance weighting table of FIG. 3.

Referring to FIG. 9, an exemplary luminance weighting table of FIG. 3 is shown. Each block 380 is associated with a predetermined weight 386 in the luminance weighting table 228. The weights in the luminance weighting table 228 apply the greatest weight to the luminance values in the center foreground of the image, and especially enhance the visual quality of portraits. In an alternate embodiment, the weights of the luminance weighting table 228 are adjusted for other types of images such as landscapes. In another embodiment, the values in the luminance weighting table are adjusted in response to a user selecting the type of photograph they are taking. In yet another alternate exemplary luminance weighting table, the luminance weighting table provide uniform weights.

In step 362, the activate strobe procedure 224 sums the weighted block luminances to generate the average image weighted luminance value for the preparatory image data. In step 364, the activate strobe procedure 224 determines the photographic image strobe duration for the strobe by accessing the look-up table 226 of FIG. 6 in accordance with a relationship between the average image weighted luminance and a target luminance where the target luminance is equal to eighty. The activate strobe procedure 224 divides the target luminance by the average image weighted luminance to generate a target power factor. Since the strobe power is proportional to the luminance, the target power factor represents an increase or decrease in strobe power and results in a photographic image having sufficient image quality.

The activate strobe procedure 224 determines a preparatory power value associated with the preparatory strobe activation from the look-up table 226 of FIG. 6 from the first 50 s entry, and multiplies the preparatory power value by the target power factor to generate a photographic image power value. The activate strobe procedure 224 accesses the look-up table a second time to identify upper and lower calibration power values that are closest to the photographic image power value, and generates the photographic image strobe duration by performing a linear interpolation between the upper and lower power values and target value, and the respective upper and lower calibration durations. In an alternate embodiment, the activate strobe procedure 224 accesses the look-up table 226 a second time to identify a calibration power value closest to the photographic image power value, and sets the photographic image strobe duration equal to the duration associated with the identified calibration power value in the table 226.

When the activate strobe procedure 224 accesses the look-up table for the second time, the power values and durations for the second through final entries are used, and the power value and duration for the first 50 s entry is not used. Using the second through final entries provides a strobe duration for the photographic image that compensates for charge lost in the high voltage supply of the strobe circuit from activating the strobe for preparatory duration to acquire the preparatory image.

Figure 10:
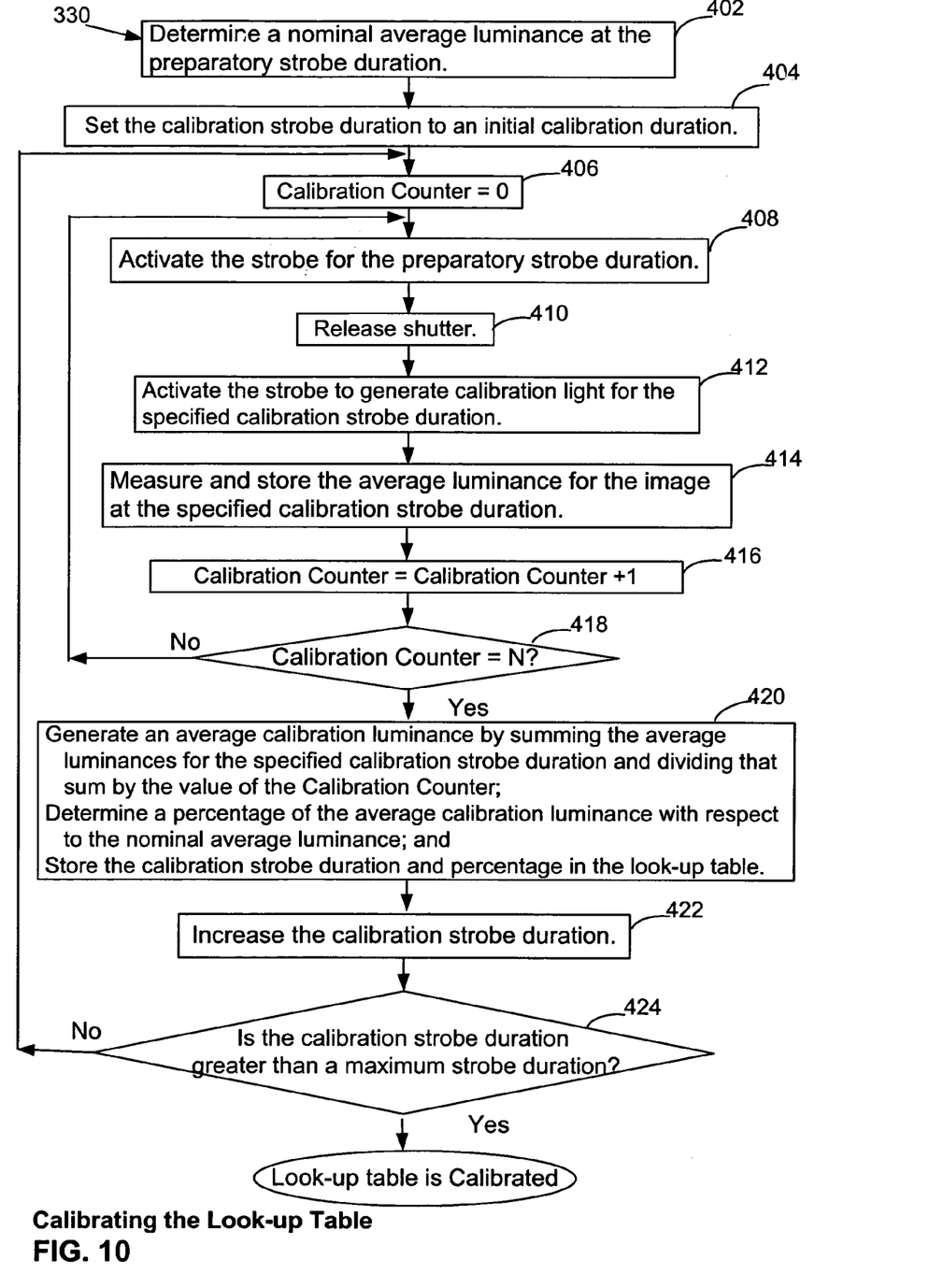
FIG. 10 is a flowchart of a calibrate look-up table procedure of FIG. 3 and FIG. 5.

FIG. 10 is a flowchart of a calibrate look-up table procedure of FIG. 3 and FIG. 5. FIG. 10 provides more detail with respect to step 330 of FIG. 5. To calibrate the look-up table, the calibrate look-up table procedure 240 is loaded into the memory of the digital imager. The digital imager is placed in a darkened box that substantially eliminates ambient light, and is aimed at a test surface three feet away. The test surface is an eighteen percent gray surface, which reflects eighteen percent of the incident light.

In step 402, the calibrate look-up table procedure 240 determines a nominal average luminance at the preparatory strobe duration. The calibrate look-up table procedure 240 activates the strobe for the preparatory strobe duration a predetermined number of times, such as ten. After each activation of the strobe, the calibrate look-up table procedure 240 measures the average luminance for that activation. To measure the average luminance, a block of pixels in the center ten percent of the image sensor is identified. In one implementation, the block of pixels is ninety pixels wide and ninety pixels high. Because the eye is most sensitive to green, the green pixels in the block are used to determine the luminance. The intensity value of the green pixels in the block is summed and divided by the number of green pixels to generate the average luminance for a single activation of the strobe. After the strobe has been activated for the predetermined number of times, the average luminances are summed and divided by the predetermined number of strobe activations to generate the nominal average luminance. By generating the nominal average luminance by activating the strobe multiple times, deviations in the luminance are included in the average. However, in an alternate embodiment, when an average luminance exceeds an upper threshold value, or is below a lower threshold value for the calibration strobe duration, the strobe or strobe circuit may be defective, and the calibrate look-up table procedure 240 provides an operator with an indication of a possible defect.

After determining the nominal average luminance, the strobe is activated for various calibration durations. A relationship between the nominal average luminance and an average calibration luminance at various calibration durations is measured and stored in the look-up table. In step 404, the calibrate look-up table procedure 240 sets a calibration strobe duration equal to an initial calibration duration, such as twenty-five microseconds. In step 406, the calibrate look-up table procedure 240 sets the value of a calibration counter equal to zero. The calibration counter is used to count a number of times that the strobe is activated for a specified calibration duration.

In step 408, the strobe is activated for the preparatory strobe duration to discharge a capacitor in the high voltage supply in the strobe interface circuit. In this way, the look-up table is calibrated under conditions more closely resembling normal operation. After activating the strobe, the calibrate look-up table procedure 240 waits approximately fifty milliseconds. In step 410, the calibrate look-up table procedure 240 dumps any accumulated charge from the image sensor and releases the shutter to acquire an image, as described above. In step 412, the calibrate look-up table procedure 240 activates the strobe to generate calibration light for the specified calibration strobe duration. In step 414, the calibrate look-up table procedure 240 measures and stores the average luminance for the image at the specified calibration strobe duration, and also stores the associated calibration strobe duration. The average luminance is measured as previously described with respect to step 402. In step 416, the calibrate look-up table procedure 240 increments the value of calibration counter by one. In step 418, the calibrate look-up table procedure 240 determines whether the value of the calibration counter is equal to a predetermined maximum calibration count value (N). Preferably, the maximum calibration count value is greater than one. In an alternate embodiment, the maximum calibration count value is equal to two. Having more than one average luminance reduces the effect of aberrations in a measurement. If step 418 determines that the value of the calibration counter is not equal to the maximum calibration count value (N), steps 408 through 418 are repeated to generate an additional average luminance at the specified calibration strobe duration.

If step 418 determines that the value of the calibration counter is equal to the maximum calibration count value (N), then in step 420, the calibrate look-up table procedure 240 updates the look-up table for the calibration strobe duration. The calibrate look-up table procedure 240 generates a calibration average luminance by summing the average luminances for the specified calibration strobe duration and dividing that sum by the value of the calibration counter. The calibrate look-up table procedure 240 determines a percentage of the calibration average luminance with respect to the nominal average luminance, and stores the calibration strobe duration and percentage in the look-up table.

In step 422, the calibrate look-up table procedure 240 increases the calibration strobe duration. In one embodiment, the calibration strobe duration is increased in equal increments. In another embodiment, the calibration strobe duration is increased non-linearly as follows: 25 microseconds (s), 50 s, 75 s, 100 s, 250 s, 500 s, 750 s and 1000 s. The initial calibration strobe duration is 25 microseconds. The calibration strobe duration is increased in 25 s increments until the calibration strobe duration equal 100 s. The calibration strobe duration is then increased to 250 s, and then increased in 250 s increments until the calibration strobe duration is equal to 1000 s. In another alternate embodiment, after measuring at the calibration strobe duration of 100 s, the calibration strobe duration is increased to 400 s and 800 s, as shown in FIG. 6. These calibration strobe durations were chosen because the strobe does not generate light linearly with respect to the duration of activation of the strobe. The greatest change in luminance is in the shorter strobe durations.

In step 424, the calibrate look-up table procedure 240 determines whether the calibration strobe duration is greater than a maximum strobe duration. If not, the calibrate look-up table procedure 240 repeats steps 406–424. If so, then the look-up table is calibrated.

In an alternate embodiment, the average luminance is determined using the red, green and blue color channels as described above with respect to FIG. 7, rather than only the green color channel. Although the strobe has been described with respect to an exemplary electronic digital camera, the strobe can be used with electronic scanners and copiers. In addition, the present invention can be used with portable electronic devices having an image sensor and light source to illuminate an object, such as a personal digital assistant (PDA). While various embodiments of the invention have been described, it will be apparent to those of ordinary skill in the art that many more embodiments and implementations are possible that are within the scope of this invention.

What is claimed is:

1. A method of adjusting image lighting, the method comprising:
   generating a preparatory light for a predetermined preparatory duration;
   capturing a preparatory image while generating the preparatory light, wherein the preparatory image is represented by preparatory image data;
   determining an average preparatory image luminance of the preparatory image based on the preparatory image data and weighting at least a subset of the preparatory image data;
   generating a supplemental strobe duration based on the average preparatory image luminance and luminance weightings; and
   generating a look-up table storing associated image strobe durations and power values including a preparatory image strobe duration and associated preparatory power value.

2. The method of claim 1 wherein the generating the supplemental strobe duration further comprises:
   generating average block luminances for subsets of the preparatory image data;
   applying the luminance weightings to at least a subset of the average block luminances to generate weighted average block luminance; and
   determining the average image luminance based on the weighted average block luminance.

3. The method of claim 2 wherein the luminance weightings are stored in a weighting table, and the applying further comprises:
   accessing the weighting table to retrieve respective luminance weightings corresponding to portions of the preparatory image; and
   multiplying the average block luminance by the respective luminance weightings to provide the average weighted block luminance.

4. The method of claim 1, further comprising:
   generating an adjustment factor by dividing a predetermined target luminance by the average image luminance;
   multiplying the preparatory luminance power value by the adjustment factor to generate a target luminance power value; and
   identifying, in the look-up table, an identified strobe duration corresponding to the target luminance power value, the identified strobe duration being the supplemental strobe duration.

5. The method of claim 1, wherein generating the supplemental strobe duration further comprises:
   generating a light adjustment factor by dividing a predetermined target luminance by the average image luminance;
   multiplying the preparatory power value by the light adjustment factor to generate a target look-up table power value;
   identifying, from the look-up table, first and second look-up table power values that are greater and less than, respectively, the target look-up table power value, the first and second look-up table power values having associated first and second image strobe durations; and
   generating a final image strobe duration by interpolating the first and second image strobe durations in accordance with the target look-up table power value.

6. The method of claim 1 further comprising:
   accessing the look-up table based on the average image luminance.

7. A memory having machine readable instructions for execution by a processor to adjust image lighting, the memory comprising:
   a first set of machine readable instructions for acquiring a preparatory image while generating a preparatory light for a predetermined preparatory duration;
   a second set of machine readable instructions for determining an average preparatory image luminance based on preparatory image data associated with the preparatory image and weighting at least a subset of the preparatory image data;
   a third set of machine readable instructions for generating a supplemental strobe duration based on the average preparatory image luminance and luminance weightings; and
   a set of machine readable instructions for generating a look-up table that stores associated image strobe durations and power values including a preparatory image strobe duration and an associated preparatory power value.

8. The memory of claim 7, wherein the machine readable instructions that generate the supplemental strobe duration further include:
   a fourth set of machine readable instructions for generating average block luminances for subsets of the preparatory image data;

a fifth set of machine readable instructions applying the luminance weightings to at least a subset of the average block luminances to generate weighted average block luminance; and a sixth set of machine readable instructions for determining the average image luminance based on the weighted average block luminance.

9. The memory of claim 8, further comprising:

a seventh set of machine readable instructions for storing the luminance weightings in a weighting table;

a eighth set of machine readable instructions for accessing the weighting table to retrieve respective luminance weightings corresponding to portions of the preparatory image; and a ninth set of machine readable instructions for multiplying the average block luminance by the respective luminance weightings to provide the average weighted block luminance.

10. The memory of claim 7, further comprising machine readable instructions that include:

an eleventh set of machine readable instructions for multiplying the preparatory luminance power value by the adjustment factor to generate a target luminance power value; and a twelfth set of machine readable instructions for identifying, in the look-up table, an identified strobe duration corresponding to the target luminance power value, the identified strobe duration being the supplemental strobe duration.

11. The memory of claim 7, further comprising:

a fourteenth set of machine readable instructions for generating a light adjustment factor by dividing a predetermined target luminance by the average image luminance;

a fifteenth set of machine readable instructions for multiplying the preparatory power value by the light adjustment factor to generate a target look-up table power value;

a sixteenth set of machine readable instructions for identifying, from the look-up table, first and second look-up power values that are greater and less than, respectively, the target look-up table power value, the first and second look-up table power values having associated first and second image strobe durations; and a seventeenth set of machine readable instructions for generating a final image strobe duration by interpolating the first and second image strobe durations in accordance with the target look-up table power value.

12. The memory of claim 7, wherein the instructions that determine the supplemental strobe duration access the look-up table based on the average image luminance and at least one luminance power value is used to generate the supplemental strobe duration.

13. The memory of claim 12, wherein the eighteenth set of machine readable instructions for generating the look-up table, include:

a nineteenth set of machine readable instructions for capturing a set of calibration images, each calibration image being associated with a predetermined calibration strobe duration, one calibration strobe duration being substantially equal to the preparatory image strobe duration; and a twentieth set of machine readable instructions for generating power values corresponding to each calibration image with respect to a luminance value associated with the predetermined preparatory duration.

14. A digital imaging system comprising:

a processor electrically connected to a strobe;

an image sensor coupled to a memory, where a supplemental strobe duration stored in the memory is generated from a preparatory image received at the processor from the image sensor when the strobe is activated to generate a preparatory light for a predetermined preparatory duration;

wherein the processor accesses a look-up table in the memory that stores image strobe durations and power values including a preparatory image strobe duration and an associated preparatory power value.

15. The digital image system of claim 14, wherein the processor divides the preparatory image data into subsets and generates average block luminances for each subset and applies the luminance weightings to at least a subset of the average block luminances, resulting in weighted average block luminance used to derive the weighted average block luminance.

16. The digital image system of claim 14, wherein the memory has a weighting table that stores the luminance weighting.

17. The digital image system of claim 14, wherein the processor generates an adjustment factor by dividing a predetermined target luminance by the average image luminance power value and then multiplying the adjustment factor by the preparatory luminance power value to derive the target luminance power value that corresponds to an identified strobe duration in the look-up table.

18. A method of adjusting image lighting on a preparatory image, the method comprising:

generating a preparatory light for a predetermined preparatory duration;

determining an average preparatory image luminance of the preparatory image represented by preparatory image data based on the preparatory image data and weighting at least a subset of the preparatory image data;

generating a supplemental strobe duration based on the average preparatory image luminance and luminance weightings;

generating a look-up table storing associated image strobe durations and power values including a preparatory image strobe duration and associated preparatory power value;

generating an adjustment factor by dividing a predetermined target luminance by the average image luminance;

multiplying the preparatory luminance power value by the adjustment factor to generate a target luminance power value; and identifying, in the look-up table, an identified strobe duration corresponding to the target luminance power value, the identified strobe duration being the supplemental strobe duration.

19. A method of adjusting image lighting on a preparatory image, the method comprising:

generating a preparatory light for a predetermined preparatory duration;

determining an average preparatory image luminance of the preparatory image represented by preparatory image data based on the preparatory image data and weighting at least a subset of the preparatory image data; and generating a supplemental strobe duration based on the average preparatory image luminance and luminance weightings, wherein generating the supplemental strobe duration further comprises generating a look-up table storing associated image strobe durations and luminance power values including a preparatory image strobe duration and a preparatory power value;

generating a light adjustment factor by dividing a predetermined target luminance by the average image luminance;

multiplying the preparatory power value by the light adjustment factor to generate a target look-up table power value;

identifying, from the look-up table, first and second look-up table power values that are greater and less than, respectively, the target look-up table power value, the first and second look-up table power values having associated first and second image strobe durations; and generating a final image strobe duration by interpolating the first and second image strobe durations in accordance with the target look-up table power value.

20. A method of adjusting image lighting on a preparatory image, the method comprising:

generating a preparatory light for a predetermined preparatory duration;

determining an average preparatory image luminance of the preparatory image represented by preparatory image data based on the preparatory image data and weighting at least a subset of the preparatory image data;

generating a supplemental strobe duration based on the average preparatory image luminance and luminance weightings;

generating a look-up table storing associated image strobe durations and luminance power values including a preparatory image strobe duration and a preparatory power value; and accessing the look-up table based on the average image luminance.

21. A memory having machine readable instructions for execution by a processor to adjust image lighting on a preparatory image, the memory comprising:

a first set of machine readable instructions for acquiring a preparatory image;

a second set of machine readable instructions for determining an average preparatory image luminance based on preparatory image data associated with the preparatory image and weighting at least a subset of the preparatory image data;

a third set of machine readable instructions for generating a supplemental strobe duration based on the average preparatory image luminance and luminance weightings;

a fourth set of machine readable instructions for generating a look-up table that stores associated image strobe durations and power values including a preparatory image strobe duration and an associated preparatory power value;

a fifth set of machine readable instructions for multiplying the preparatory luminance power value by the adjustment factor to generate a target luminance power value; and a sixth set of machine readable instructions for identifying, in the look-up table, an identified strobe duration corresponding to the target luminance power value, the identified strobe duration being the supplemental strobe duration.

22. A memory having machine readable instructions for adjusting image lighting on a preparatory image, the memory comprising:

a first set of machine readable instructions for acquiring a preparatory image;

a second set of machine readable instructions for determining an average preparatory image luminance based on preparatory image data associated with the preparatory image and weighting at least a subset of the preparatory image data;

a third set of machine readable instructions for generating a supplemental strobe duration based on the average preparatory image luminance and luminance weightings;

a fourth set of machine readable instructions for generating a look-up table that stores associated image strobe durations and luminance power values including a preparatory image strobe duration and a preparatory power value;

a fifth set of machine readable instructions for generating a light adjustment factor by dividing a predetermined target luminance by the average image luminance;

a sixth set of machine readable instructions for multiplying the preparatory power value by the light adjustment factor to generate a target look-up table power value;

a seventh set of machine readable instructions for identifying, from the look-up table, first and second look-up power values that are greater and less than, respectively, the target look-up table power value, the first and second look-up table power values having associated first and second image strobe durations; and a eighth set of machine readable instructions for generating a final image strobe duration by interpolating the first and second image strobe durations in accordance with the target look-up table power value.

23. A memory having machine readable instructions for adjusting image lighting on a preparatory image, the memory comprising:

a first set of machine readable instructions for acquiring a preparatory image;

a second set of machine readable instructions for determining an average preparatory image luminance based on preparatory image data associated with the preparatory image and weighting at least a subset of the preparatory image data;

a third set of machine readable instructions for generating a supplemental strobe duration based on the average preparatory image luminance and luminance weightings; and a fourth set of machine readable instructions for generating a look-up table that stores associated image strobe durations and luminance power values including a preparatory image strobe duration and a preparatory power value, wherein the instructions that determine the supplemental strobe duration access the look-up table based on the average image luminance and at least one luminance power value is used to generate the supplemental strobe duration.

24. The memory of claim 23, wherein the fourth set of machine readable instructions for generating the look-up table, include:

a fifth set of machine readable instructions for capturing a set of calibration images, each calibration image being associated with a predetermined calibration strobe duration, one calibration strobe duration being substantially equal to the preparatory image strobe duration; and a sixth set of machine readable instructions for generating power values corresponding to each calibration image with respect to a luminance value associated with the predetermined preparatory duration.

25. A digital imaging system comprising:

a processor electrically connected to a strobe; and an image sensor coupled to a memory, where a supplemental strobe duration stored in the memory is generated from a preparatory image received at the processor from the image sensor when the strobe is activated to generate a preparatory light for a predetermined preparatory duration;

wherein the processor accesses a look-up table in the memory that stores image strobe durations and power values including a preparatory image strobe duration and an associated preparatory power value to generate an adjustment factor by dividing a predetermined target luminance by the average image luminance power value and then multiplying the adjustment factor by the preparatory luminance power value to derive the target luminance power value that corresponds to an identified strobe duration in the look-up table.

26. The method of claim 1 wherein, the capturing captures a single preparatory image.

27. The memory of claim 7, wherein the first set of machine readable instructions acquires a single preparatory image.

28. The digital image system of claim 14, wherein the supplemental strobe duration stored in the memory is generated from a single preparatory image.

* * * * *